(12) United States Patent
Shen et al.

(10) Patent No.: US 8,970,258 B2
(45) Date of Patent: Mar. 3, 2015

(54) SYSTEMS AND METHODS FOR EDGE CONTROL IN A SWITCHED OUTPUT STAGE

(71) Applicant: Cirrus Logic, Inc., Austin, TX (US)

(72) Inventors: Dan Shen, Austin, TX (US); Johann Gaboriau, Austin, TX (US); Lingli Zhang, Austin, TX (US); Christian Larsen, Austin, TX (US)

(73) Assignee: Cirrus Logic, Inc., Austin, TX (US)

( * ) Notice: Subject to any disclaimer, the term of this patent is extended or adjusted under 35 U.S.C. 154(b) by 136 days.

(21) Appl. No.: 13/830,047

(22) Filed: Mar. 14, 2013

(65) Prior Publication Data

US 2014/0266126 A1    Sep. 18, 2014

(51) Int. Cl.
*H03K 3/00* (2006.01)
*H02M 1/08* (2006.01)

(52) U.S. Cl.
CPC ........................................ *H02M 1/08* (2013.01)
USPC ............. 327/108; 327/112; 327/383; 326/82; 326/83

(58) Field of Classification Search
USPC ................ 327/108, 112, 379–383, 427, 437; 326/82–87
See application file for complete search history.

(56) References Cited

U.S. PATENT DOCUMENTS

| | | | |
|---|---|---|---|
| 4,096,398 A * | 6/1978 | Khaitan | 326/70 |
| 4,829,199 A | 5/1989 | Prater | |
| 4,855,623 A | 8/1989 | Flaherty | |
| 5,121,000 A | 6/1992 | Naghshineh | |
| 5,180,936 A * | 1/1993 | McDonald | 327/382 |
| 5,237,213 A | 8/1993 | Tanoi | |
| 5,450,019 A | 9/1995 | McClure et al. | |
| 5,877,647 A | 3/1999 | Vajapey et al. | |
| 6,018,256 A | 1/2000 | Kumagai et al. | |
| 6,137,322 A | 10/2000 | Ten Eyck | |
| 6,265,915 B1 | 7/2001 | Rider et al. | |
| 6,366,129 B1 | 4/2002 | Douglas, III et al. | |
| 6,373,300 B2 | 4/2002 | Welch et al. | |
| 6,985,015 B2 * | 1/2006 | Ajit | 327/108 |
| 7,190,225 B2 | 3/2007 | Edwards | |
| 7,215,152 B2 | 5/2007 | Dubey | |
| 7,649,414 B2 | 1/2010 | Kaya et al. | |
| 7,746,155 B2 | 6/2010 | Labbe | |
| 7,973,523 B2 | 7/2011 | Cheng | |
| 8,085,081 B2 | 12/2011 | Ogawa et al. | |
| 8,184,831 B2 | 5/2012 | Lin | |
| 2010/0067152 A1 | 3/2010 | Nakahashi et al. | |
| 2010/0164590 A1 | 7/2010 | Tsuji et al. | |
| 2010/0244930 A1 | 9/2010 | Ogawa et al. | |
| 2012/0014025 A1 | 1/2012 | Sato et al. | |
| 2012/0268091 A1 | 10/2012 | Takemae | |

* cited by examiner

*Primary Examiner* — An Luu
(74) *Attorney, Agent, or Firm* — Jackson Walker L.L.P.

(57) ABSTRACT

In accordance with embodiments of the present disclosure, systems and methods may include a switch coupled at its gate terminal to an input signal voltage, the input signal voltage for controlling a gate voltage of a gate terminal of a driver device coupled at its non-gate terminals between a rail voltage and an output node. The systems and methods may also include a diode having a first terminal and a second terminal, the diode coupled to a non-gate terminal of the switch such that when the switch is enabled, the first terminal is electrically coupled to the gate terminal of the driver device and the second terminal is electrically coupled to the output node.

16 Claims, 3 Drawing Sheets

US 8,970,258 B2

SYSTEMS AND METHODS FOR EDGE CONTROL IN A SWITCHED OUTPUT STAGE

FIELD OF DISCLOSURE

The present disclosure generally relates to an integrated circuit, and, more particularly, to systems and methods for edge control in a switched output stage of an electronic circuit, for example a switched output stage of a power converter.

BACKGROUND

Many electronic devices on the market today often use power converters to convert electric energy from one form to another (e.g., converting between alternating current and direct current), amplifying a voltage or current of an electrical signal, modifying a frequency of an electrical signal, or some combination of the above. Examples of power converters may include boost converters, buck converters, and audio amplifiers (including, but not limited to Class D and Class H amplifiers). Such power converters often employ a switched output stage, an example of which is shown in FIG. 1. In FIG. 1, switched output stage 100 comprises a pull-up device 102 (e.g., a switch, a p-type metal-oxide-semiconductor field effect transistor, etc.) coupled at its non-gate terminals between a supply voltage and an output node, and a pull-down device 104 (e.g., a switch, an n-type metal-oxide-semiconductor field effect transistor, etc.) coupled at its non-gate terminals between a ground voltage and the output node. Predriver circuitry 106 may receive an input voltage $v_{IN}$ (typically a pulse-width-modulated input voltage signal) and apply control logic and/or buffering to such input voltage to drive a pull-up device driving signal voltage $v_P$ to the gate terminal of pull-up device 102 and to drive a pull-down device driving signal voltage $v_N$ to the gate terminal of pull-down device 104, wherein $v_P$ and $v_N$ are each a function of $v_{IN}$. Accordingly, switched output stage 100 generates an output voltage $v_{OUT}$ to its output node which is a function of $v_{IN}$.

One drawback in using switched output stages in a power converter is the presence of ringing, electromagnetic interference, or other undesirable effects which may be caused by many factors, including parasitic impedances between various nodes of the switched output stage. Overshoot and subsequent ringing may occur as a result of parasitic capacitances and inductances in the circuit resonating at their characteristic frequency, which decays over time due to resistances present in the circuit. For example, as output voltage signal $v_{OUT}$ transitions from a ground voltage to a supply voltage, $v_{OUT}$ may first overshoot the supply voltage by a particular amount of voltage, and then oscillate about the supply voltage as the ringing decays. Overshoot and ringing may be undesirable as they may cause unneeded current to flow (e.g., thereby wasting energy and potentially causing undesirable heat), may delay arrival at a desired final state, and/or may cause communication of incorrect signals.

Traditional approaches to reduction of overshoot and ringing include increasing the rise and fall times of device driving signals (e.g., $v_P$ and $v_N$). However, such approaches are not without disadvantages, as increasing rise and fall times places constraints on timing parameters (e.g., minimum duty cycle) associated with the switched output stage. FIG. 2 illustrates example voltage and current graphs associated with switched output stage 100 illustrated in FIG. 1 during a rising-edge transition of $v_{OUT}$, as is known in the art. As shown in FIG. 2, pull-down device driving signal voltage $v_N$ may decrease from a high voltage (e.g., a supply voltage) to a plateau voltage during a time period $t_1$, and then remain at such plateau voltage during a period of time $t_2$, before falling to zero. Also as shown in FIG. 2, $v_{OUT}$ may transition from zero to a supply voltage during time $t_2$. Those of skill in the art may recognize that a long time period $t_1$ places constraints on timing parameters (e.g., minimum duty cycle) associated with switched output stage 100 and thus negatively affects timing efficiency and power efficiency while not significantly improving electromagnetic interference. Conversely, long time period $t_2$ will likely show reduced electromagnetic interference, overshoot, and ringing than a shorter time period $t_2$. Assuming a constant current $i_N$ flowing from the gate terminal of pull-down device 104 to predriver circuitry 106 during each of time periods $t_1$ and $t_2$, any increase in time period $t_2$ results in an increase in time period $t_1$, and vice versa.

Although the foregoing discussion is limited to the waveform for pull-down device driving signal voltage $v_N$, analogous problems, disadvantages, and challenges may exist with respect to pull-up device driving signal voltage $v_P$.

SUMMARY

In accordance with the teachings of the present disclosure, certain disadvantages and problems associated with output signal integrity of a switched output stage of an electronic circuit may be reduced or eliminated.

In accordance with embodiments of the present disclosure, an apparatus may include a switch coupled at its gate terminal to an input signal voltage, the input signal voltage for controlling a gate voltage of a gate terminal of a driver device coupled at its non-gate terminals between a rail voltage and an output node. The apparatus may also include a diode having a first terminal and a second terminal, the diode coupled to a non-gate terminal of the switch such that when the switch is enabled, the first terminal is electrically coupled to the gate terminal of the driver device and the second terminal is electrically coupled to the output node.

In accordance with these and other embodiments of the present disclosure, a method may include selectively enabling a switch coupled at its gate terminal to an input signal voltage, the input signal voltage for controlling a gate voltage of a gate terminal of a driver device coupled at its non-gate terminals between a rail voltage and an output node. The method may also include, responsive to the enabling of the switch, electrically coupling a first terminal of a diode to the gate terminal of the driver device and electrically coupling a second terminal of the diode to the output node, wherein the diode is coupled to a non-gate terminal of the diode.

Technical advantages of the present disclosure may be readily apparent to one of ordinary skill in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 3:
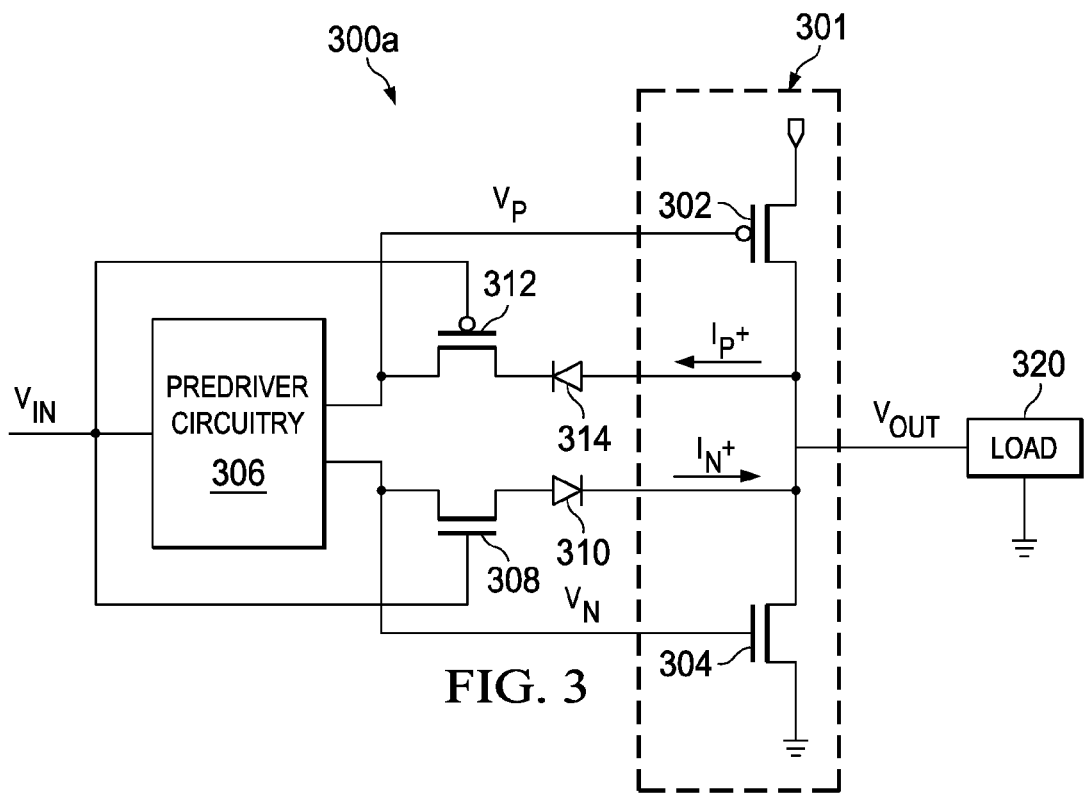
FIG. 3 illustrates an example circuit for edge control in a switched output stage of a power converter, in accordance with embodiments of the present disclosure.

FIG. 3 illustrates an example circuit 300a for edge control in a switched output stage 301 of a power converter, in accordance with embodiments of the present disclosure. As shown in FIG. 3, circuit 300a may comprise a switched output stage 301, predriver circuitry 306, a pull-down driver node switch 308, a pull-down driver node diode 310, a pull-up driver node switch 312, a pull-up driver node diode 314, and a load 320.

Switched output stage 301 may comprise a pull-up driver device 302 (implemented as a p-type metal-oxide-semiconductor field effect transistor in the embodiments represented by FIG. 3) coupled at its non-gate terminals between a supply voltage and an output node and a pull-down driver device 304 (implemented as an n-type metal-oxide-semiconductor field effect transistor in the embodiments represented by FIG. 3) coupled at its non-gate terminals between a ground voltage and the output node.

Predriver circuitry 306 may comprise any system, device, or apparatus configured to receive an input voltage $v_{IN}$ (e.g., a pulse-width-modulated voltage signal) and apply control logic and/or buffering to such input voltage to drive a pull-up device driving signal voltage $v_P$ to the gate terminal of pull-up driver device 302 and to drive a pull-down device driving signal voltage $v_N$ to the gate terminal of pull-down driver device 304, wherein $v_P$ and $v_N$ are each a function of $v_{IN}$. Based on respective input voltage signals $v_P$ and $v_N$ driven to their respective gates, pull-up driver device 302 and pull-down driver device 304 may drive an output voltage $v_{OUT}$ to load 320 which is a function of the respective input voltage signals. In some embodiments, switched output stage 301 may comprise at least a portion of an output stage of a power converter. In certain of such embodiments, such power converter may comprise a Class-D amplifier.

As shown in FIG. 3, pull-down driver node switch 308 (implemented as an n-type metal-oxide-semiconductor field effect transistor in the embodiments represented by FIG. 3) may be coupled at its non-gate terminals between the gate terminal of pull-down driver device 304 and an anode terminal of pull-down driver node diode 310 and may be driven at its input by the input voltage signal $v_{IN}$ (or a derivative thereof). Pull-down driver node diode 310 may include any system, device, or apparatus comprising an anode terminal and a cathode terminal which has an asymmetric transfer characteristic, with low resistance to current flow in one direction (e.g., from its anode terminal to its cathode terminal) when the voltage differential between its anode terminal and cathode terminal exceeds a threshold voltage, and high resistance to current flow in the opposite direction. For example, pull-down driver node diode 310 may comprise a semiconductor diode, with a p-n junction coupled between the anode terminal and the cathode terminal. As shown in FIG. 3, pull-down driver node diode 310 may be coupled at its anode terminal to a non-gate terminal of pull-down driver node switch 308 and coupled at its cathode terminal to the output of switched output stage 301.

Figure 1:
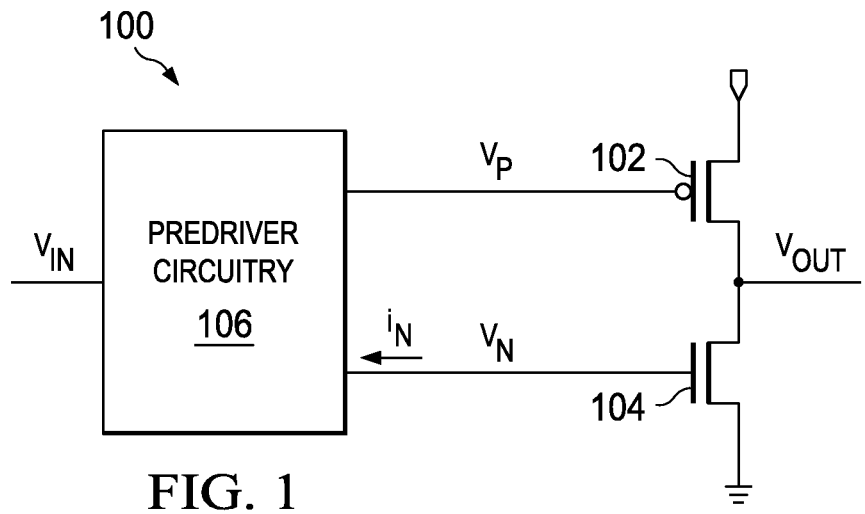
FIG. 1 illustrates a switched output stage for a power converter, as is known in the art.
Figure 2:
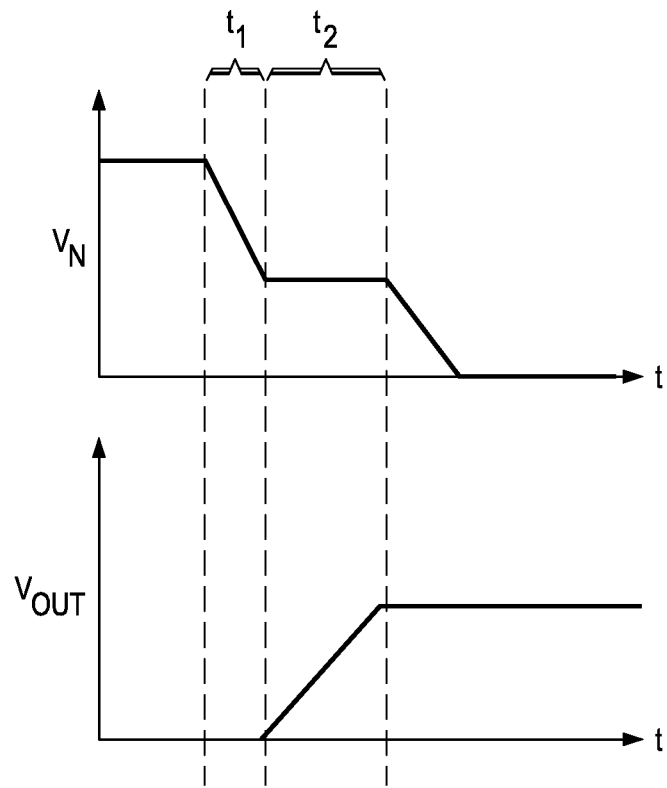
FIG. 2 illustrates example voltage and current graphs associated with the switched output stage illustrated in FIG. 1, as is known in the art.

In operation, when pull-down driver node switch 308 is enabled, the anode terminal of pull-down driver node diode 310 is electrically coupled to the gate terminal of pull-down driver device 304 and the cathode terminal is electrically coupled to the output of switched output stage 301. Accordingly, during the falling transition of pull-down device driving signal voltage $v_N$ (during the rising transition of $v_{OUT}$), the voltage difference between the anode terminal and cathode terminal of pull-down driver node diode 310 will exceed its threshold voltage, and a current $i_{N+}$ will flow, enabling fast pull down of $v_N$ (e.g., corresponding to time period $t_1$ depicted in FIG. 2) until $v_N$ reaches its plateau voltage, at which time pull-down driver node diode 310 may turn off. Accordingly, the current flowing at the gate terminal of pull-down device 304 while $v_N$ transitions from its maximum voltage to the plateau voltage (e.g., corresponding to time period $t_1$ depicted in FIG. 2) will be greater than that of the current flowing at the gate terminal of pull-down device 304 while $v_N$ is at its plateau voltage (e.g., corresponding to time period $t_2$ depicted in FIG. 2), thus reducing time period $t_1$ relative to time period $t_2$ as compared to the case in which current remains constant during both time periods. Thus, the circuit formed by switch 308 and diode 310 may provide advantages relative to existing approaches for edge control, as such circuit may increase portions of the falling edge of pull-down device driving signal voltage $v_N$ which reduce may electromagnetic interference, overshoot, and ringing (e.g., portions corresponding to time period $t_2$ depicted in FIG. 2), relative to the portions of the falling edge of pull-down device driving signal voltage $v_N$ which contribute to limit timing and power efficiency (e.g., portions corresponding to time period $t_1$ depicted in FIG. 2).

Pull-up driver node switch 312 and pull-up driver node diode 314 may have functionality analogous to that of pull-down driver node switch 308 and pull-down driver node diode 310. As shown in FIG. 3, pull-up driver node switch 312 (implemented as a p-type metal-oxide-semiconductor field effect transistor in the embodiments represented by FIG. 3) may be coupled at its non-gate terminals between the gate terminal of pull-up driver device 302 and a cathode terminal of pull-up driver node diode 314 and may be driven at its input by the input voltage signal $v_{IN}$ (or a derivative thereof). Pull-up driver node diode 314 may include any system, device, or apparatus comprising an anode terminal and a cathode terminal which has an asymmetric transfer characteristic, with low resistance to current flow in one direction (e.g., from its anode terminal to its cathode terminal) when the voltage differential between its anode terminal and cathode terminal exceeds a threshold voltage, and high resistance to current flow in the opposite direction. For example, pull-up driver node diode 314 may comprise a semiconductor diode, with a p-n junction coupled between the anode terminal and the cathode terminal. As shown in FIG. 3, pull-up driver node diode 314 may be coupled at its cathode terminal to a non-gate terminal of pull-up driver node switch 312 and coupled at its anode terminal to the output of switched output stage 301.

In operation, when pull-up driver node switch 312 is enabled, the cathode terminal of pull-up driver node diode 314 is electrically coupled to the gate terminal of pull-up driver device 302 and the anode terminal is electrically coupled to the output of switched output stage 301. Accordingly, during the rising transition of pull-up device driving signal voltage $v_P$ (during the falling transition of $v_{OUT}$), the voltage difference between the anode terminal and cathode terminal of pull-up driver node diode 314 will exceed its threshold voltage, and a current $i_{P+}$ will flow, enabling fast pull up of $v_P$ (e.g., during a time period analogous to time period $t_1$ depicted in FIG. 2) until $v_P$ reaches its plateau voltage, at which time pull-up driver node diode 314 may turn off. Accordingly, the current flowing at the gate terminal of pull-up device 302 while $v_P$ transitions from its minimum voltage to its plateau voltage (e.g., during a time period analogous to time period $t_1$ depicted in FIG. 2) will be greater than that of the current flowing at the gate terminal of pull-up device 302 while $v_P$ is at its plateau voltage (e.g., during a time period analogous to time period $t_2$ depicted in FIG. 2), thus reducing time period $t_1$ relative to time period $t_2$ from the case in which current remains constant during both time periods. Thus, the circuit formed by switch 312 and diode 314 may provide advantages relative to existing approaches for edge control, as such circuit may increase portions of the rising edge of pull-up device driving signal voltage $v_P$ which reduce may electromagnetic interference, overshoot, and ringing (e.g., portions analogous to time period $t_2$ depicted in FIG. 2), relative to the portions of the falling edge of pull-up device driving signal voltage $v_P$ which contribute to limit timing and power efficiency (e.g., portions analogous to time period $t_1$ depicted in FIG. 2).

Load 320 may comprise any suitable load that may be driven by switched output stage 301, including, without limitation, an audio speaker.

Figure 4:
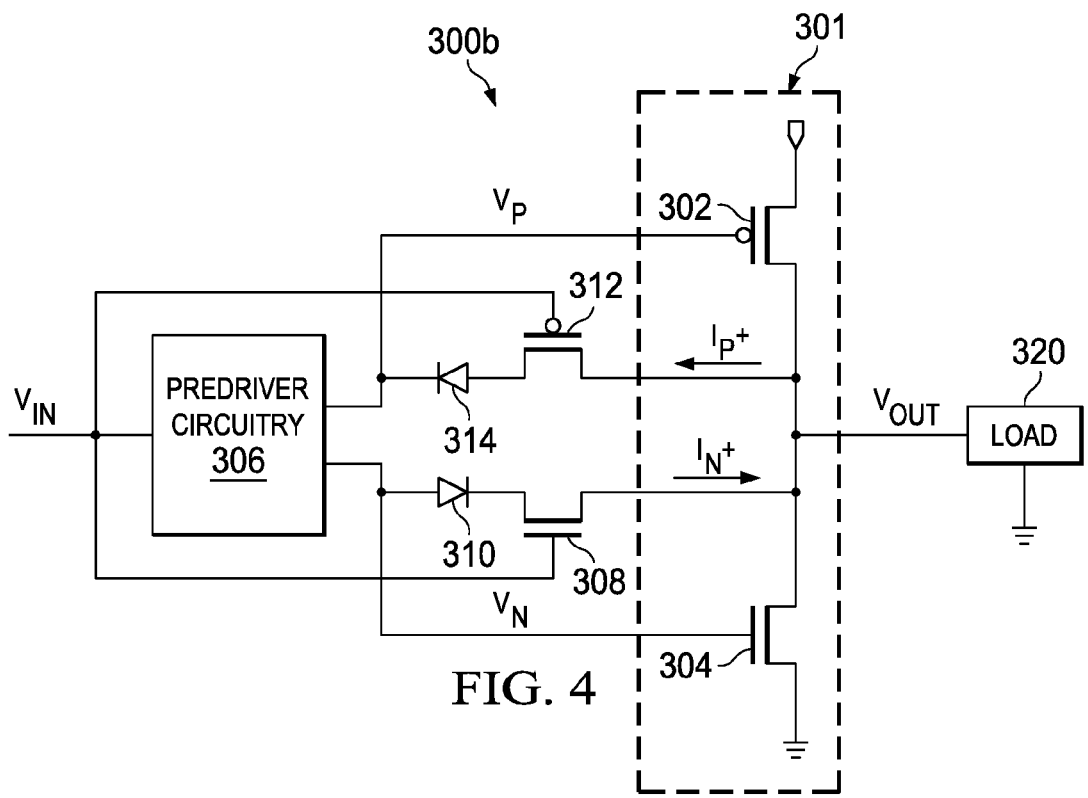
FIG. 4 illustrates another example circuit for edge control in a switched output stage of a power converter, in accordance with embodiments of the present disclosure.

FIG. 4 illustrates an example circuit 300b for edge control in a switched output stage 301 of a power converter, in accordance with embodiments of the present disclosure. Circuit 300b is similar in functionality to circuit 300a depicted in FIG. 3, and is identical except that the locations of pull-down driver node switch 308 and pull-down driver node diode 310 are swapped and the locations of pull-up driver node switch 312 and pull-up driver node diode 314 are swapped. Thus, in the embodiments represented by FIG. 4, pull-down driver node switch 308 may be coupled at its non-gate terminals between the output of switched output stage 301 and the cathode terminal of pull-down driver node diode 310 and may be driven at its input by the input voltage signal $v_{IN}$ (or a derivative thereof), while pull-down driver node diode 310 may be coupled at its cathode terminal to a non-gate terminal of pull-down driver node switch 308 and coupled at its anode terminal to the gate terminal of pull-down driver device 304. Similarly, in the embodiments represented by FIG. 4, pull-up driver node switch 312 may be coupled at its non-gate terminals between the output of switched output stage 301 and the anode terminal of pull-up driver node diode 314 and may be driven at its input by the input voltage signal $v_{IN}$ (or a derivative thereof), while pull-up driver node diode 314 may be coupled at its anode terminal to a non-gate terminal of pull-up driver node switch 312 and coupled at its cathode terminal to the gate terminal of pull-down driver device 302.

Figure 5:
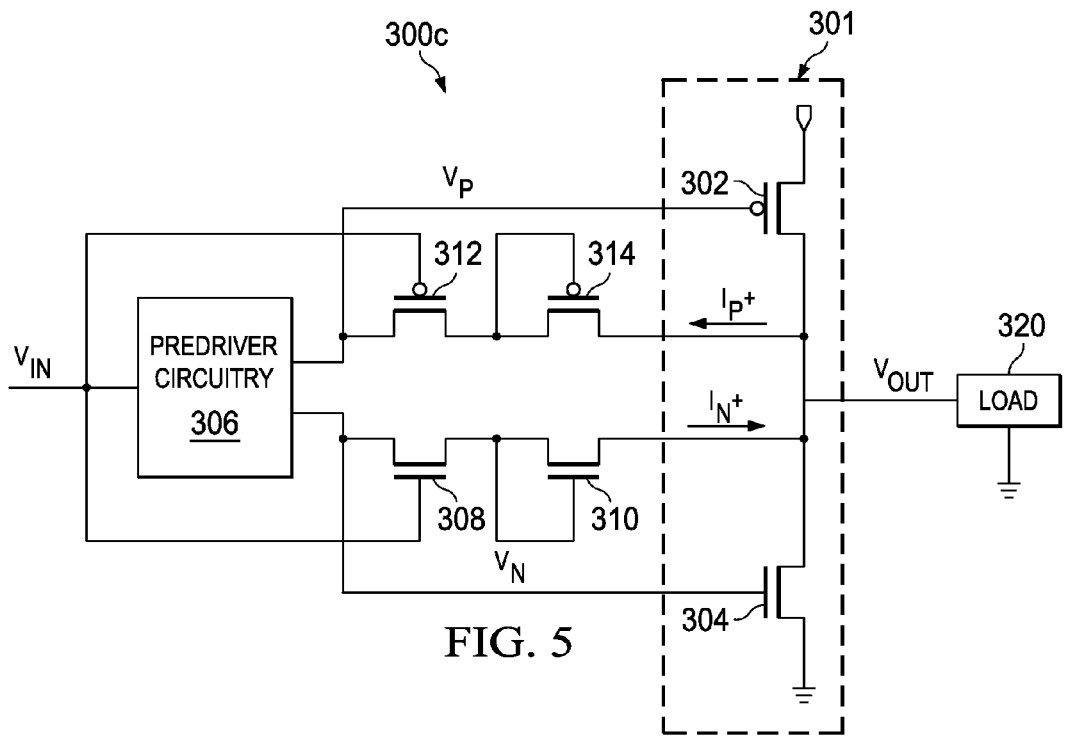
FIG. 5 illustrates another example circuit for edge control in a switched output stage of a power converter, in accordance with embodiments of the present disclosure.

FIG. 5 illustrates another example circuit 300c for edge control in a switched output stage 301 of a power converter, in accordance with embodiments of the present disclosure. Circuit 300c is similar in functionality to circuit 300a depicted in FIG. 3, and is identical except that pull-down driver node diode 310 is implemented as an n-type metal-oxide-semiconductor field effect transistor with its gate terminal coupled to one of its non-gate terminals and pull-up driver node diode 314 is implemented as a p-type metal-oxide-semiconductor field effect transistor with its gate terminal coupled to one of its non-gate terminals.

Figure 6:
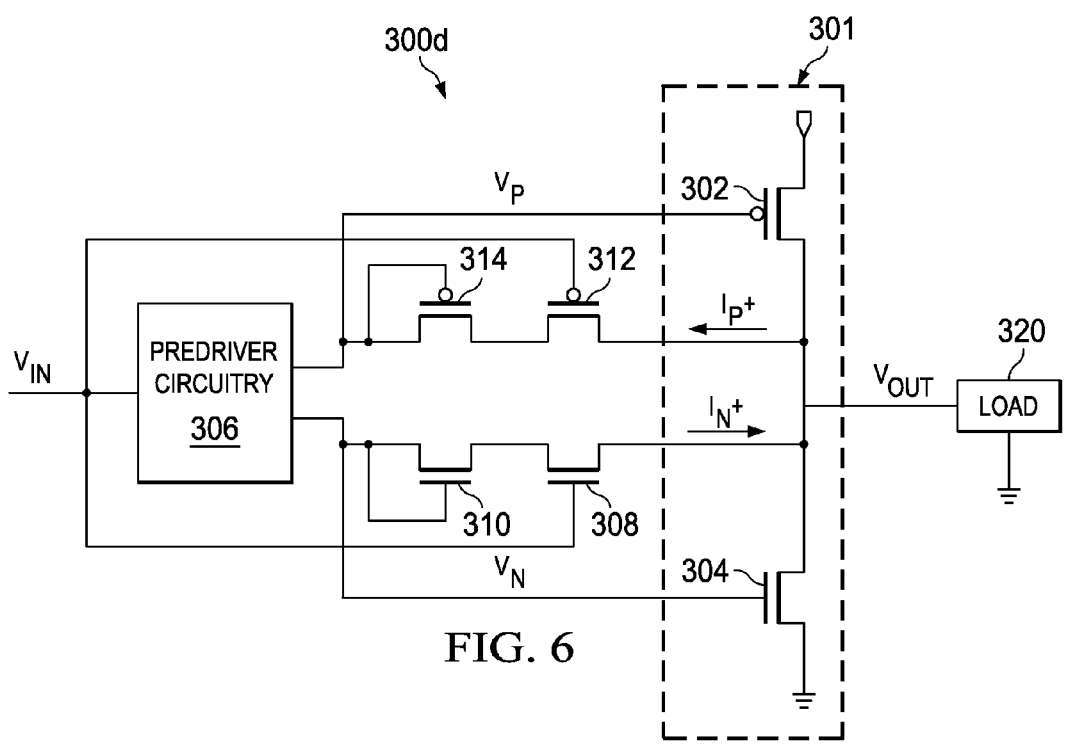
FIG. 6 illustrates another example circuit for edge control in a switched output stage of a power converter, in accordance with embodiments of the present disclosure.

FIG. 6 illustrates another example circuit 300d for edge control in a switched output stage 301 of a power converter, in accordance with embodiments of the present disclosure. Circuit 300d is similar in functionality to circuit 300b depicted in FIG. 4, and is identical except that pull-down driver node diode 310 is implemented as an n-type metal-oxide-semiconductor field effect transistor with its gate terminal coupled to one of its non-gate terminals and pull-up driver node diode 314 is implemented as a p-type metal-oxide-semiconductor field effect transistor with its gate terminal coupled to one of its non-gate terminals.

As used herein, the term "rail voltage" broadly refers to one of a supply voltage and a ground voltage. As used herein, when two or more elements are referred to as "coupled" to one another, such term indicates that such two or more elements are in electronic communication whether connected indirectly or directly, without or without intervening elements.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

What is claimed is:

1. An apparatus comprising:
   a switch configured to receive at its gate terminal an input indicative of an input signal voltage, the input signal voltage for controlling a gate voltage of a gate terminal of a driver device coupled at its non-gate terminals between a rail voltage and an output node; and
   a diode having a first terminal and a second terminal, the diode coupled to a non-gate terminal of the switch such that when the switch is enabled, the first terminal is electrically coupled to the gate terminal of the driver device and the second terminal is electrically coupled to the output node.

2. The apparatus of claim 1, wherein the diode is coupled at the second terminal to the non-gate terminal of the switch and coupled at the first terminal to the gate terminal of the driver device.

3. The apparatus of claim 1, wherein the diode is coupled at the first terminal to the non-gate terminal of the switch and coupled at the second terminal to the output node.

4. The apparatus of claim 1, wherein the diode is implemented as a transistor having its gate terminal coupled to one of its non-gate terminals.

5. The apparatus of claim 4, wherein the diode is implemented as a p-type metal-oxide-semiconductor field effect transistor, such that the first terminal comprises a cathode terminal of the diode and the second terminal comprises an anode terminal of the diode.

6. The apparatus of claim 5, wherein the diode is implemented as an n-type metal-oxide-semiconductor field effect transistor, such that the first terminal comprises an anode terminal of the diode and the second terminal comprises a cathode terminal of the diode.

7. The apparatus of claim 1, wherein the driver device comprises at least a portion of an output stage of a power converter.

8. The apparatus of claim 7, wherein the driver device comprises at least a portion of an output stage of a Class-D amplifier.

9. A method comprising:
  selectively enabling a switch coupled at its gate terminal to an input indicative of an input signal voltage, the input signal voltage for controlling a gate voltage of a gate terminal of a driver device coupled at its non-gate terminals between a rail voltage and an output node; and
  responsive to the enabling of the switch, electrically coupling a first terminal of a diode to the gate terminal of the driver device and electrically coupling a second terminal of the diode to the output node, wherein the diode is coupled to a non-gate terminal of the diode.

10. The method of claim 9, wherein the diode is coupled at the second terminal to the non-gate terminal of the switch and coupled at the first terminal to the gate terminal of the driver device.

11. The method of claim 9, wherein the diode is coupled at the first terminal to the non-gate terminal of the switch and coupled at the second terminal to the output node.

12. The method of claim 9, wherein the diode is implemented as a transistor having its gate terminal coupled to one of its non-gate terminals.

13. The method of claim 12, wherein the diode is implemented as a p-type metal-oxide-semiconductor field effect transistor, such that the first terminal comprises a cathode terminal of the diode and the second terminal comprises an anode terminal of the diode.

14. The method of claim 12, wherein the diode is implemented as an n-type metal-oxide-semiconductor field effect transistor, such that the first terminal comprises an anode terminal of the diode and the second terminal comprises a cathode terminal of the diode.

15. The method of claim 9, wherein the driver device comprises at least a portion of an output stage of a power converter.

16. The method of claim 15, wherein the driver device comprises at least a portion of an output stage of a Class-D amplifier.

* * * * *